Jan. 2, 1951  V. VICTOR  2,536,401
GAUGE BLOCK

Filed Sept. 14, 1944  3 Sheets-Sheet 1

INVENTOR.
Victor Victor
BY
ATTORNEYS

Jan. 2, 1951  V. VICTOR  2,536,401
GAUGE BLOCK

Filed Sept. 14, 1944  3 Sheets-Sheet 2

INVENTOR.
Victor Victor
BY
Duell, Kane & Smoot
ATTORNEYS

Jan. 2, 1951 V. VICTOR 2,536,401
GAUGE BLOCK
Filed Sept. 14, 1944 3 Sheets-Sheet 3
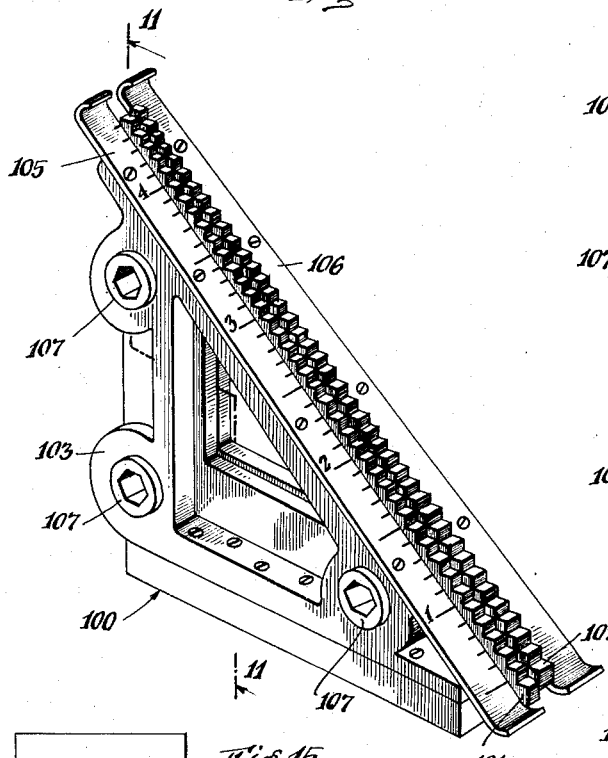
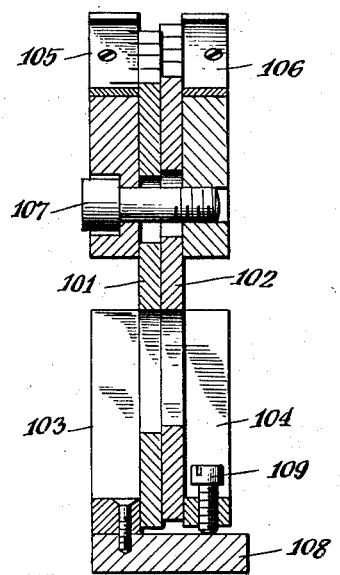
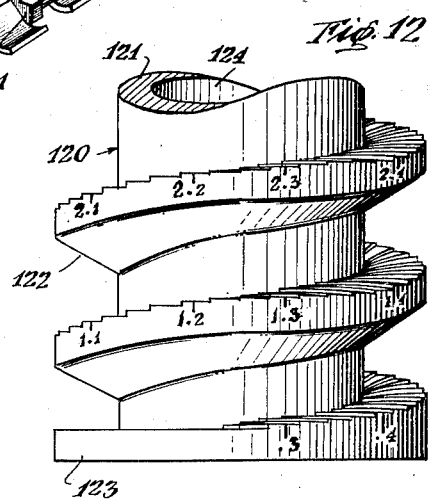
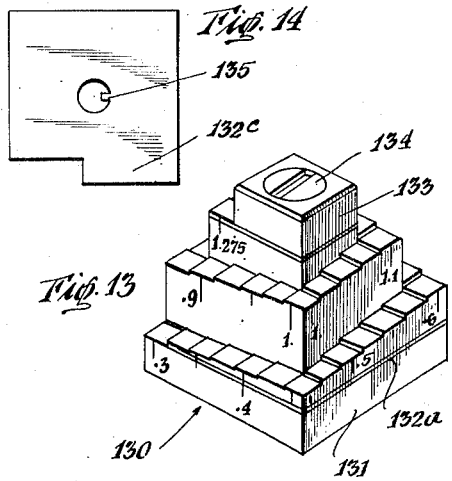
INVENTOR.
Victor Victor
BY
Duell, Kane & Smoot
ATTORNEYS Patented Jan. 2, 1951

2,536,401

UNITED STATES PATENT OFFICE 2,536,401

GAUGE BLOCK

Victor Victor, Hempstead, N. Y.

Application September 14, 1944, Serial No. 553,979

3 Claims. (Cl. 33—168)

This invention relates to improved gauging means, and particularly to an improved system of dimension-establishing gauge blocks.

It is an object of the invention to provide a gauge comprising a single multiple step unit or a combination of such unit with one or possibly two cooperating units for increasing the total measurement range by means of which certain routine functions of mechanical inspection practice which presently call for the use of costly one-dimensional gauge block systems, master parts, or special dimension-establishing units, may be performed with hitherto unattainable speed and efficiency.

It is an object of the invention to provide a gauge block or gauge block system, which presents more dimension-establishing surface per block and a greater range per number of blocks employed, than may be obtained by contemporary gauge block systems.

It is an object of the invention to provide improved and suitably accurate gauging blocks which are so relatively inexpensive to manufacture and use, as compared to presently utilized systems such as Johansson blocks as to make it economical for even a relatively small machine shop to have a number of sets available not only for its inspection personnel, but to its producing machinists or machine tool operators.

It is another object of the invention to provide a gauge block having a plurality of steps or like dimension-establishing surfaces, said steps being of comparatively large area and accurately disposed at an uninterrupted progression of equal increments above a datum plane, in such physical and mathematical arrangement that the exact height of each step is self-evident, and the time-consuming processes of identification, selection, and assembly, now needed to establish equivalent checking levels with ordinary gauge blocks, are consequently eliminated.

It is a further object of the invention to provide a stepped gauge block which, alone or in combination with other block or blocks, provides an uninterrupted series of dimension-establishing planes at a repetitive increment no greater than the dial-face range of a conventional d'al-indicator of precision measurement, over an unbroken range limited only by the maximum height of all the blocks together.

The invention is applicable to a very large proportion of the test and inspection procedures employed in manufacturing establishments; and is of particular importance when employed as means for setting comparators or like measurement devices whose self-contained capacity for direct precision measurement is limited to the dial face range of the indicator upon the comparator. Such dial face range, for measurement in thousandths of an inch, rarely exceeds .100" and usually is not more than .030". Yet employing the present invention, such a comparator may be set to the nearest thousandth of an inch in the total adjustment range of the comparator itself.

Because of this fact—plus the new speed and ease of checking-surface presentation provided by the present invention—such an inexpensive indicator-bearing comparator as the common surface gauge for example, may be employed, with the invention, to measure any number of different locations on an article as accurately and rapidly as such dimensions may now be measured with relatively expensive and skill demanding devices such as vernier height gauges. Also, with the present invention, a vernier height gauge may perform its operations without being removed from the surface plate and without the necessity of the operator's using the vernier attachment of the height gauge.

Thus, the present invention increases the efficiency of the inspection personnel by eliminating, alike, the usual eye strain and much of the time and liability to error, inherent in the use of verniers.

The hereindescribed system of gauge blocks, which may contain no increment of measurement smaller, for example, than .025", nevertheless provides an accurate means of uninterrupted precision measurement to the nearest one-thousandth of an inch.

This is because the usual indicator, present upon the comparator or other conventional instrument to be used with the invention, itself provides all interim units of measurement. Practically all comparator indicators are adjustable to read zero at any level at which the test point of the comparator is set. Hence, if the test-point of such a comparator be set on a part-surface supposed to be, say, .506 inch above a given level, and the indicator set at zero, then, when the same test-point is referred to the .500 step of a version of the present gauge, the indicator-dial will read minus .006 if the part-dimension was correct, or exactly such divergence from minus .006 as the part may be in error.

The new means thus provided by the present invention, to check rapidly any dimension in thousandths over a large range with only one to three size blocks, makes it a sort of universal checking fixture, quite capable of replacing many elaborate special ones, now customarily devised at great cost for the multi-dimensional inspection of housings and similar parts.

Other features and advantages of the invention will be apparent from the detailed description of the several embodiments thereof.

In the accompanying drawings:

Figs. 1, 3, 4 and 5 show various embodiments of the present invention, each embodiment affording a plurality of measurement planes disposed accurately at an uninterrupted progression of equal increments above a datum plane;

Fig. 2 contains diagrammatic plan views of the Fig. 1 type of gauge to illustrate differently incremented measurement planes;

Figs. 6 to 9 inclusive show base blocks by means of which the total range of measurement of the units of Figs. 1 to 5 may be increased; each of the bases of Figs. 6 through 9 presents a plurality of accurately established measurement planes upon which the respective units of Figs. 1 to 5 may be positioned;

Fig. 10 is an embodiment of another form of the invention;

Fig. 11 is an elevation, partly in section, along lines 11—11, of the embodiment of Fig. 10;

Fig. 12 is an elevation of another form of the invention in which the dimension-establishing planes are developed about a cylinder;

Fig. 13 is a perspective of an embodiment of the invention in which the measurement planes are developed spirally in such manner that vertical clearance is provided for vertical approach types of indicators;

Fig. 14 is a plan view of an element of the embodiment of Fig. 13; and

Fig. 15 is a plan view representing a plurality of elements similar to Fig. 14 in stacked relationship.

Figure 1:
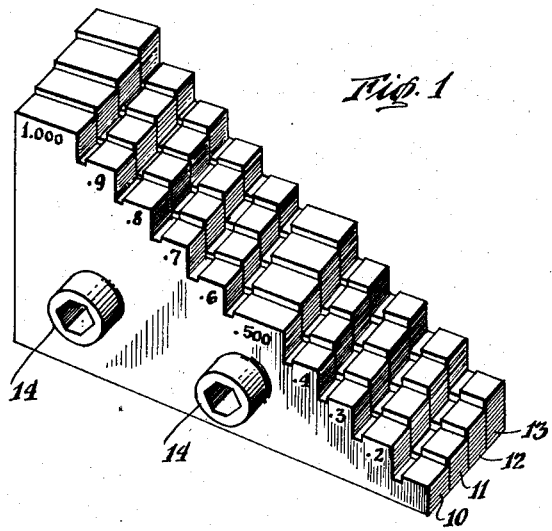

Referring to the drawings, the embodiment of Fig. 1 shows in enlarged scale a form of the invention providing a "head" or gauge in which are 40 dimension-establishing planes arranged in .025" increments from a level disposed .100" above the base, to a final plane which is 1.075" above the base.

In the construction shown, the gauge comprises a plurality of plates, respectively designated 10, 11, 12 and 13, of hardened and ground tool steel or equivalent, and mutually secured by set screws 14, the ends of which may engage tapped holes in plate 13, or may pass through plate 13 to be secured by nuts, as desired.

Each plate is of right triangular configuration. The bottom of each is ground and lapped, and is squared with the side walls which are in parallel relationship throughout. The abutting side walls of the respective plates may be rough finished and, if desired, given a thin adhesive film to supplement the set screws 14 in holding the plates firmly relatively to each other during usage.

The hypotenuse of each of the plates is subdivided into a plurality of planes, each parallel to the base, and in the embodiment shown, each being disposed .100" above the other. In plate 10, the top of the first step is .100" above the base, and the last is 1.000" above the base. Each succeeding plate is similarly subdivided in .100" increments; the top of the step of each succeeding plate is .025" above the corresponding step in the preceding plate. For example, the top of the first step of plate 11 is at a level .125" above the base; the top of the first step of plate 12 is .150", and the top of the first step of plate 13 is .175" above the base. This relationship obtains throughout the structure, and it will therefore be apparent that the topmost step of plate 13 is 1.075" above the base.

In the Fig. 1 embodiment it is possible for the user to select an accurately positioned measurement plane at any .025" increment from a minimum dimension of .100" to a maximum of 1.075". By the use of supplemental bases, as later described, this uninterrupted arithmetical progression of measurement planes afforded by the present "head" may be extended over a multiplied measurement range.

Figure 2:
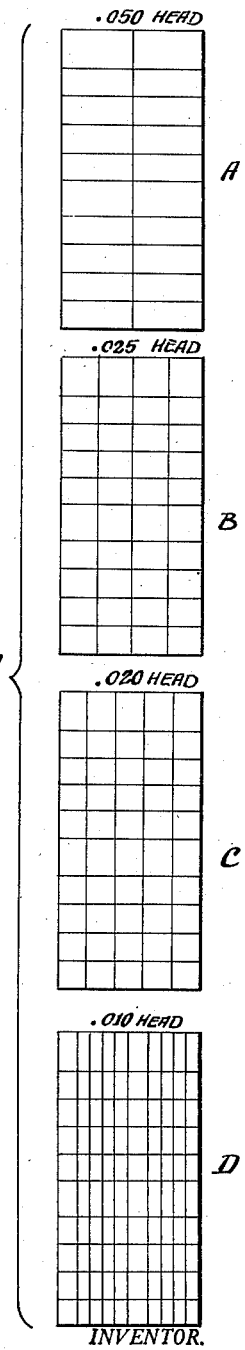

Fig. 2 represents plan views of embodiments of Fig. 1 in which are provided other subdivisions of the increment between successive principal-increment steps. For example, Fig. 2B is a plan view of the dimension-establishing surfaces of the Fig. 1 embodiment. Fig. 2A shows a plan view of an embodiment employing two plates in which the increment between the corresponding steps of each of the plates is .050". Fig. 2C illustrates an organization of five plates so arranged that the height-increment subdivision, as taken transversely of the long axis of the unit, is .020". Fig. 2D illustrates the employment of ten plates so arranged that the transverse increment subdivision is .010". The embodiments are thus characterized by .100" increments taken in a direction longitudinally of the unit, with the said .100" increments being subdivided as desired, in a transverse direction by the several successive plates of a unit. In other words, the transverse increments subdivide each of the longitudinal or hypotenuse increments of the unit.

In order to physically differentiate the larger subdivisions of the unit, such as the .500 and 1.000" levels, the areas of the planes at such levels may be increased so that such levels will be immediately distinguishable from the rest. In addition, in the Fig. 2D form, the sixth plate may be wider than the others. The user, therefore, with the aid of the distinctively widened areas never has to count more than five up and five across to locate any particular step in any of the forms of Figs. 1 and 2.

The distinctive usefulness of the longitudinal and transverse steps of the embodiment of Figs. 1 and 2 is apparent when it is considered that to include in a single triangular plate, all of the measurement planes therein provided, the plate would be of excessive length, extremely difficult to manufacture to proper tolerance, and would be extremely cumbersome and inept in use.

A feature of great practical importance in the Fig. 1 embodiment is that the maximum number of measurement planes to be ground and finished in any one unit is held to ten, and large numbers of the relatively thin plates employed may be processed as one in the forming and finishing operations.

Figure 3:
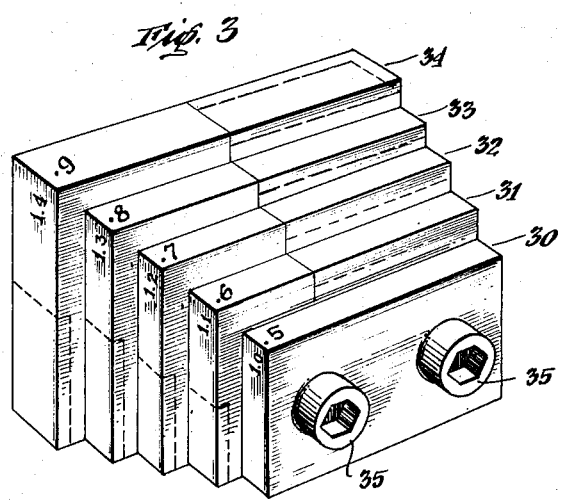

The embodiment of Fig. 3 shows, on enlarged scale, a second form of measurement head in which the number of dimension-establishing planes has been limited to permit construction out of unindented plates, with consequent economies of manufacture. The minimum increment in the Fig. 3 embodiment is .100", in an uninterrupted progression from .500" to 1.400" above the datum plane. However, as indicated by the dot-dash lines, the respective plates may be configurated to provide a minimum increment of .050" over the same total range. This would, of course, destroy the point of economy just made if actual plates were used. But it is important to note that in this, or in all other embodiments of the present invention, it is the external configuration of any total unit thereof, rather than the manner of its attainment, which supplies the functional, and therefore most vital, element of the invention.

As shown in the solid line representations of Fig. 3, said unit comprises a plurality of rectangular blocks 30, 31, 32, 33, 34 so secured, as by the set screws 35, that all of the blocks have two planes in common, namely, a longitudinal base plane and a vertical end plane. Thus, the blocks may be set on a supplemental base, surface plate or other datum plane either longitudinally, as shown in Fig. 3, or vertically. When in the horizontal position, the vertical measurement planes range from .500″ to .900″ above the base; when the unit is rotated through 90 degrees so that its longitudinal dimension is vertical, measurement planes disposed 1.000″ to 1.400″ above the datum are presented.

Figures 4, 5:
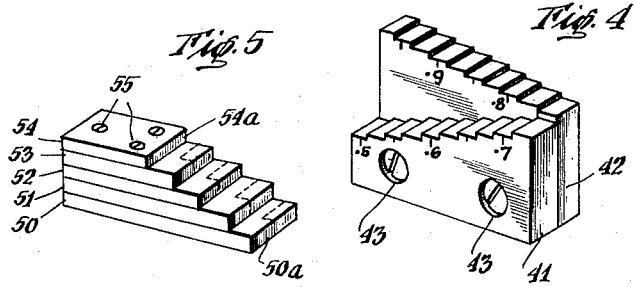

In the embodiment of Fig. 4, two plates respectively 41 and 42, are of essentially right triangular configuration with the hypotenuse of each plate subdivided into a plurality of measurement planes in a desired vertical increment. The plates are mutually secured by screws 43, or equivalent. It should be understood that more than two plates may be employed in the mutually reversed, "continuous flight" arrangement as desired, or the length and height of the plates increased, to extend the total vertical measurement range, the low limit of which is determined, of course, by the location of the first step of plate 41 above the base. It is preferred, however, to hold the unit to compact size, and to increase the vertical measurement range by the employment of supplemental bases. Scale-markings adapted to the step-increment employed—in the illustrated instance .025—reveal the height of each step.

The Fig. 5 embodiment comprises a plurality of plates of equal thickness, 50, 51, 52, 53, 54, mutually secured by the screws 55, to present a "staircase" affording five measurement planes disposed at equal and continuous increments of predetermined elevations above the datum plane.

If the length of the plates, or their equivalent for configuration purposes, be also controlled, this unit, like the Fig. 3 embodiment, may likewise be employed either in horizontal position, as shown, or may be set on the vertical end plane so that the end surfaces 50a to 54a, inclusive, may represent measurement planes disposed at additional established intervals above the datum. Similarly, as in Fig. 3, the plates may be further configurated as indicated in broken line, so that when the unit is positioned vertically, the increments between the surfaces 54a to 50a will be subdivided to increase the measurement facilities.

In the units of Fig. 1 to Fig. 5, the increments of increase of the respective measurement planes and the subdivisions thereof are not limited to the decimal-inch system previously described. Obviously, other measurement systems—i. e., metric or inch-fraction—may be employed. It is, however, important that the minimum increment presented by the head must be evenly divisible into its major increment, and that the latter be of an exceedingly simple mathematical character—such as 1 inch, 1 centimeter, or ½ inch—suitable for convenient employment as the repetitive increment of a range-multiplying base. The total range of a head, however, may actually be one minimum increment less than this major increment without interrupting the arithmetical progression of the minimum increment throughout the added range of the base.

The supplemental bases shown in various embodiments of Figs. 6 through 9 may be employed in conjunction with the primary measurement blocks or "heads" previously described, or with each other. The function of said bases is to continue the arithmetical progression of the range of measurement provided in gauges or heads previously described.

Figure 6:
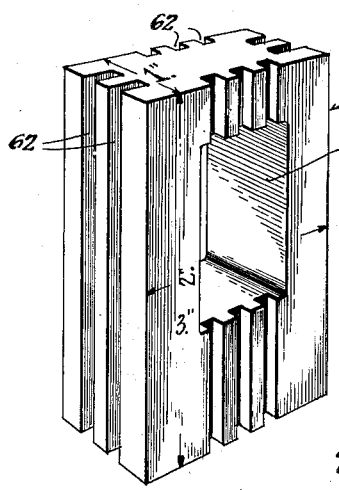

Referring now to Fig. 6, the base block 60 presents three equal increments of height according to the plane on which the block rests. For example, the block may define a parallelepiped in which the front and rear wall surfaces, as viewed in the figure, may represent a thickness of 1.00″, the respective side wall surfaces, a width of 2.00″ and the upper and base walls, a height of 3.00″.

The respective pairs of walls are parallel one with the other and square with their respective contiguous walls. Thus, in the position shown, the block 60 will present a datum plane 3″ high above the base, and upon such datum plane may be mounted any of the embodiments of Figs. 1 through 5. Similarly, the block may establish dimensions 1″ or 2″ above a base, and in each instance its measurement plane will accommodate one of the previously described subdivided blocks. It will therefore be apparent that if the self-contained range of the head block alone is within one minimum increment of 1 inch or more, this base will add three inches to the uninterrupted progression of minimum increments supplied by the head.

The unit 60 may be machined from steel or from a preformed casting of one of the close-grained and abrasion-resistant iron alloys such as "Meehanite," with hard chrome plating desirable in the latter case. The structure may be lightened by the central aperture 61 and by the plurality of grooves 62. The aperture and grooves also afford "nonslip" grips for handling the unit.

Figure 7:
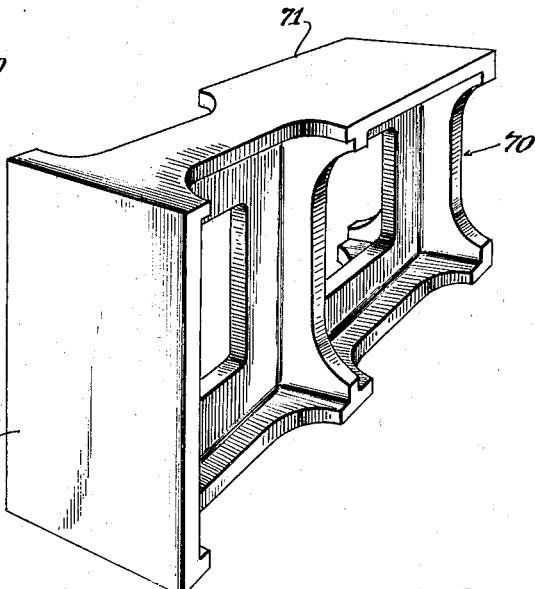

A base 70 suitable for multiplying the range of measurement still further may be as shown in Fig. 7 in which the transverse dimension may be 6.00″ and the vertical dimension 3.00″, for example. The base 70 may be given a skeletonized and ribbed configuration shown, to eliminate weight without sacrifice of rigidity. The unit 70 affords two measurement planes 71, 72 upon either of which a head unit, or a preceding base unit such as that of Fig. 6, may be mounted.

A total gauge consisting, for example, of a 3″ x 6″ version of the Fig. 7 unit, a 1″ x 2″ x 3″ version of the Fig. 6 unit, and the head shown in Fig. 1, will be found to render available an unbroken progression of 400 instantly identifiable .025 dimension-establishing planes from .100 inch to 10.075 inches above the datum.

Figure 8:
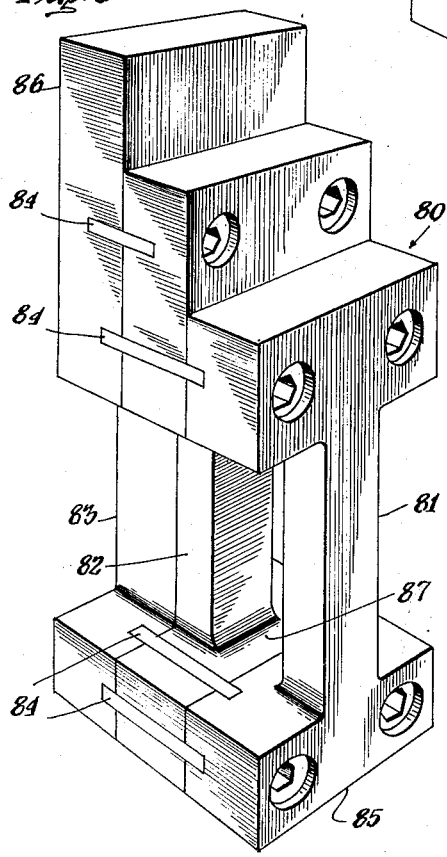

In Fig. 8 there is shown a base unit 80 which affords a greater head range multiplication than the embodiments of Figs. 6 or 7. As here constructed, the unit 80 comprises a plurality, illustratively three, of structures 81, 82, 83, mutually secured as by the set screws illustrated, supplemented, if desired, by keys 84, or equivalent. The respective structures 81, 82, 83 are so arranged that they have a common base as represented by the surface 85 when the unit is positioned as illustrated, and another common base represented by the surface 86 when the unit is rotated through 90 degrees to lie horizontal.

The width of the unit need be controlled only to the extent of providing adequately long placement surfaces for the head, or other preceding unit, with which it is to be used. But its thickness and height, and those of the component structures 81, 82, and 83, must be dimensionally accurate. Assuming the last, it will be apparent that if, for example, the thickness of each of these structures be 1", and their respective heights 4", 5", and 6", the unit shown will afford placement surfaces at an uninterrupted series of six one inch increments above the datum.

The elements 81 and 82 may be configurated to afford a hand-hole 87; it will be understood that the respective blocks may be hollowed, grooved, or otherwise configurated to reduce weight; and that their combined, or functional, configuration, may be attained, as in other embodiments of the invention, by other structural means.

Figure 9:
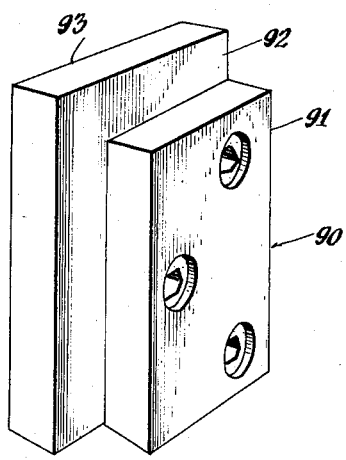

Fig. 9 discloses an even more compact base-configuration than that of Fig. 8 for adding six times the major increment of an associated head to the range of said head. As shown, the unit 90 consists of but two ground and lapped tool steel blocks 91 and 92 of equal thickness secured as by countersunk set screws, illustrated, in such manner that the blocks share a common base on two of their edges, and the entire unit has a third base represented by the surface 93 of the plate 92. Plate 91, for example, may be .500" x 1.500" x 2.500" in size, and plate 92, .500" x 2.000 x 3.000". Wherever these exact proportions, regardless of actual dimension, are held, it will be found that the unit 90 presents head-placement surfaces at an uninterrupted progression six height increments each equal to the thickness of the plates. Hence, if that thickness be, as in the illustrative case, .500", the base, when employed with a head of .500 major increment such as those shown in Figs. 4 and 5, would add three inches of uninterrupted measurement range to the range of such head. And this added range could, quite as in the case of Fig. 6, be further multiplied by a supplemental base like that of Fig. 7.

Fig. 10 illustrates a gauge 100 which has, inherently, a much larger self-contained range than the units of Figs. 1 to 5, while affording the subdivision into minimum increments which is characteristic of the latter units. In Fig. 10, a pair of relatively thin plates 101, 102 are of triangular configuration and are subdivided, along their respective hypotenuses, into a series of parallel measurement planes which may represent such increments as are desired. In the embodiment shown, each plate is divided into .100" vertical increments and the measurement planes of the respective plates are so offset as to halve the said .100" rises.

However, quite as in the case of Figs. 1 and 2, whose basic principle of step-conformation the present unit also employs, any desired number of plates, of any desired longitudinal and subdividing transverse increments, may be used in the new supporting configuration shown. And the relatively broad base here provided regardless of the number of plates would give gauge-block stability, and therefore practicality, to even a single thin plate.

The said plates may be clamped between frame structures 103, 104, the respective hypotenuses of which provide for mounting a suitably graduated scale 105 and a guard plate 106. Set screws or equivalent 107, as Fig. 11, may be utilized to confine the respective plates with respect to the frame structures. The frame structures may be secured, as by the illustrated screws, upon an accurately machined base 108, of tool steel or equivalent. If desired, and in order to insure that the vertical plane of the plates 101, 102 is precisely vertical with respect to the base 108, one or more adjustment screws 109 may be provided in the member 104.

The maximum elevation of a plane of measurement of the unit 100 as illustrated, happens to be 4.500" above the plane of the base. But it will be obvious that self-contained range of this unit is a matter of choice, and also, of course, that it can be increased at will by supplemental bases.

Fig. 12 discloses another long-range, minimum increment unit 120 in which the measurement planes are developed spirally about a cylinder. In the particular form of this development illustrated by the figure, the cylinder 121 has formed thereon a buttress thread 122 of desired pitch. The normally flat upper plane of such buttress thread may be machined, as by suitable milling, to subdivide it into a plurality of steps which may, for example, be in .025" increments. Forty such steps will then represent a vertical inch of rise. The first step may be located as desired above the base; illustratively the unit 120 has a self-formed base 123 which is .250" thick. Scale-markings provide easy identification of the height of each step.

The unit 120 is relatively easily made by precision-boring the central hole 124 of the cylinder to receive a milling fixture arbor. Mounted upon such an arbor, the cylinder with its buttress thread, is advanced .025" against a rotating cutter mounted on a parallel arbor, indexed 9 degrees (9°), then advanced another .025", etc., until the desired number of steps have been cut.

It will be understood that the true essential of this embodiment is the arrangement of the steps, with means to their immediate identification, and not the particular type of cylindrical structure on which the steps are developed. To illustrate: if a spirally mounting support-flange were attached to a central spindle, and also to the relatively thin wall of a surrounding hollow cylinder, then such cylinder need only be subjected to much the same step-milling process as that just described to have the remaining portion of the cylinder wall provide the desired steps.

The unit of Fig. 12 has a disadvantage in that the cylindrical path of the buttress thread affords no vertical clearance for the vertical approach type of indicator most commonly found on repetitive test comparators. This question of vertical approach can, of course, be resolved by developing the spiral thread conically, instead of cylindrically. But the angle of the cone will necessarily limit the vertical range because the steps developed on a conical spiral of constant lead must necessarily decrease in area from the bottom to the top.

Another essentially spiral type of gauge block may be as illustrated in Fig. 13, in which 130 represents a unit in which the steps follow mutually rectangular paths in their procession from base to top. The unit 130 consists of a base block 131, illustratively .300" thick and approximately 1.4" x 1.4" square.

Mounted upon the base 131 are a stack of horizontally disposed individual plates 132a, 132b, etc., illustratively .025" thick. Only one such plate is shown in Fig. 13, in the interests of clarity of drawing. Each plate, see Fig. 15, is so configurated that it will expose a .200" x .200" measurement plane, formed by the plate immediately beneath it. It will be understood that the area of plate exposed is not critical, and that this would permit proportionate reduction of the total base area. Such reduction would adapt the present head to use with either, the Fig. 6 base or with standard gauge blocks of one inch cross section; or the same result, in terms of stability, could be obtained by simply magnetizing such range extending units.

The measurement planes of the Fig. 13 unit are readily attained by removing a corner from each plate, as shown in Figs. 14 and 15 in which Fig. 14 shows an individual plate and Fig. 15 shows a stack of plates with portions thereof broken away to reveal the underlying plates.

Each of the plates, base 131, and a retainer or cap 133 may be apertured as shown in Figs. 14 and 15, to pass a bolt 134. The bolt may be secured by a nut (not shown) countersunk within the base 131. As indicated in Figs. 14 and 15, the aperture through each plate, and through the base, may have a tongue 135 which is intended to cooperate with a longitudinal slot in the bolt 134, thereby to prevent twisting of the respective plates relative to each other; or keyways in both bolt and aperture, to receive a common key, may serve the same purpose.

In the preceding description, it has frequently been suggested that tool steel or "Meehanite" are the desirable materials for manufacture of the various embodiments of the invention. It will be apparent, however, that other materials, such as the softer metals, or plastics, may be utilized, with the respective dimension-establishing surfaces being capped with hard metal, or plated therewith; and further, that the total, or functional, configuration of the various embodiments may be attained by processes, such as molding or die-pressing, quite different from those herein illustratively suggested.

It will be apparent from the foregoing that the present invention affords a gauge block or combination of blocks which provide an uninterrupted arithmetical progression of dimension-establishing plane surfaces or steps which are parallel to and accurately located above a self-contained datum plane, in increments of height which are greater in number than could be obtained in any unindented or unstepped prism, or in any prism or structure having, without such improvements as are part of the invention, merely a uni-direction progression of plane measurement surfaces.

Whereas it is obvious that the several objects of the invention as specifically afore noted are achieved by the various embodiments as described, it is apparent that numerous rearrangements of the parts as described, as well as changes in construction, might be resorted to without departing from the spirit of the invention as defined by the claims.

I claim:

1. Gauge means comprising a plurality of mutually secured substantially right triangular plates, each of said plates having a plane base, and the plurality of plates being arranged so that their respective bases are co-planar to provide a common base plane; the hypotenuse of the first plate of the plurality being subdivided into a series of measurement planes disposed at equal increments of elevation above said base plane and parallel thereto; the hypotenuse of each successive plate being subdivided into a similar series of measurement planes parallel to the base plane; the planes of each successive plate being above the corresponding plane of the immediately preceding plate an amount which is equal to the fraction of the increment of rise of elevation of the planes of the first-named plate represented by the inverse of the total number of plates.

2. A gauge comprising a plurality of triangular plates mounted side by side upon a common stable planar base, mutually adjacent edges of the respective plates sloping at the same angle relative to the plane of said base, the said adjacent edges of each plate being formed with a like number of planes parallel with the plane of said base and disposed at equally increasing increments of height thereabove; the respective plates being mutually offset so that the respective planes of one plate are above the corresponding planes of an adjacent plate by an amount which is equal to the fraction of the increment of height between successive planes of any plate represented by the reciprocal of the number of plates.

3. A gauge comprising a pair of triangular plates, frame means for clamping said plates in face-to-face relationship with a common side of each plate in parallel relationship, a planar base for said frame means to make the structure self-supporting in stable equilibrium, and adjustment means for positioning the said plates in vertical relationship with respect to the plane of the base; the upper edge of each of the said plates being formed with an identical succession of planes parallel to the plane of the base and rising in equal-increment steps with relation thereto the said plates being vertically offset so that a plane of one plate is disposed above the adjacent plane of the other plate by an amount equal to a predetermined fraction of the height differential between successive planes of one of the plates.

VICTOR VICTOR.

REFERENCES CITED

The following references are of record in the file of this patent:

UNITED STATES PATENTS

| Number | Name | Date |
|---|---|---|
| 386,469 | Howard | July 24, 1888 |
| 861,582 | Fildes | July 30, 1907 |
| 1,472,837 | Hoke | Nov. 6, 1923 |
| 1,826,783 | Hess | Oct. 13, 1931 |
| 2,039,097 | Malm | Apr. 28, 1936 |
| 2,230,143 | Hyland | Jan. 28, 1941 |
| 2,332,360 | Wakefield | Oct. 19, 1943 |

FOREIGN PATENTS

| Number | Country | Date |
|---|---|---|
| 22,365 | Great Britain | Oct. 9, 1896 |
| 71,210 | Switzerland | Dec. 1, 1915 |

OTHER REFERENCES

Publ. American Machinist Magazine, May 27, 1943 (p. 44).

Cat. No. 17, Johansson Gage Block and Accessories, June 1, 1945, pub. by Ford Motor Co., Dearborn, Mich.